(12) United States Patent
Baez

(10) Patent No.: US 11,083,317 B2
(45) Date of Patent: Aug. 10, 2021

(54) METHODS FOR MANUFACTURING SERVING TRAY WITH INNER RAISED SURFACE INCORPORATING THERMOPLASTIC POLYURETHANE

(71) Applicant: Cambro Manufacturing Company, Huntington Beach, CA (US)

(72) Inventor: Jorge Baez, Lake Forest, CA (US)

(73) Assignee: Cambro Manufacturing Company, Huntington Beach, CA (US)

( * ) Notice: Subject to any disclaimer, the term of this patent is extended or adjusted under 35 U.S.C. 154(b) by 377 days.

(21) Appl. No.: 16/104,756

(22) Filed: Aug. 17, 2018

(65) Prior Publication Data

US 2018/0352985 A1 Dec. 13, 2018

Related U.S. Application Data

(60) Division of application No. 15/185,568, filed on Jun. 17, 2016, now abandoned, which is a
(Continued)

(51) Int. Cl.
*B29C 43/18* (2006.01)
*A47G 23/06* (2006.01)
(Continued)

(52) U.S. Cl.
CPC ............ *A47G 23/06* (2013.01); *B29C 43/021* (2013.01); *B29C 43/18* (2013.01); *B29C 43/203* (2013.01); *B29C 43/36* (2013.01); *B29C 45/14* (2013.01); *B29C 45/37* (2013.01); *B65D 21/0233* (2013.01); *B29K 2069/00* (2013.01);
(Continued)

(58) Field of Classification Search
CPC .......................... B65D 21/0233; A47G 23/06
See application file for complete search history.

(56) References Cited

U.S. PATENT DOCUMENTS 4,526,831 A * 7/1985 Hatchadoorian ..... B29C 43/203
428/300.7
4,689,275 A * 8/1987 Sandman ............... A47G 23/06
428/537.1
(Continued)

FOREIGN PATENT DOCUMENTS

GB 2110585 6/1983

*Primary Examiner* — Matthew J Daniels
(74) *Attorney, Agent, or Firm* — Marcus C. Dawes; George Bethel (57) ABSTRACT

A serving tray comprised of at least one synthetic material and an insert which provides a non-slip top surface of the serving tray. The textured relief is preferably made of thermoplastic polyurethane (TPU) which allows a glass or other item to be placed on the serving tray without the item sliding or slipping while the tray is in motion. As the tray is being fabricated, the TPU is mechanically bonded with the top surface of the tray while a textured relief is simultaneously defined into the top surface. The textured relief provides adequate frictional force to an item being placed on the tray so as to substantially prevent its lateral movement. The tray also includes an inner support structure disposed on its inner surface. The inner support structure provides an upward facing edge which allows a plurality of trays to be easily and efficiently stacked or nested on one another.

11 Claims, 8 Drawing Sheets

Related U.S. Application Data continuation-in-part of application No. 15/153,274, filed on May 12, 2016, now abandoned.

(51) Int. Cl.

| | | |
|---|---|---|
| *B29C 43/20* | (2006.01) |
| *B29C 43/36* | (2006.01) |
| *B29C 45/14* | (2006.01) |
| *B29C 45/37* | (2006.01) |
| *B65D 21/02* | (2006.01) |
| *B29C 43/02* | (2006.01) |
| *B29K 69/00* | (2006.01) |
| *B29K 75/00* | (2006.01) |
| *B29K 105/12* | (2006.01) |
| *B29K 309/08* | (2006.01) |
| *B29L 9/00* | (2006.01) |
| *B29L 31/00* | (2006.01) |
| *B29K 105/08* | (2006.01) |
| *B29K 105/06* | (2006.01) |

(52) U.S. Cl.
CPC ...... *B29K 2075/00* (2013.01); *B29K 2105/06* (2013.01); *B29K 2105/08* (2013.01); *B29K 2105/128* (2013.01); *B29K 2309/08* (2013.01); *B29L 2009/00* (2013.01); *B29L 2031/74* (2013.01)

(56) References Cited

U.S. PATENT DOCUMENTS

| | | | | |
|---|---|---|---|---|
| 4,737,390 | A | * | 4/1988 | Fricano .................. A47G 23/06 428/34.2 |
| 4,856,704 | A | * | 8/1989 | Tolson .................... B65D 1/34 229/407 |
| 5,158,202 | A | | 10/1992 | Kosonen |
| 7,152,754 | B2 | | 12/2006 | Micciulla |
| D689,740 | S | | 9/2013 | Wang |
| 2009/0152333 | A1 | * | 6/2009 | Maeaettae ................ B65D 1/34 229/104 |
| 2010/0330312 | A1 | * | 12/2010 | Stockhaus .............. B29C 43/36 428/35.6 |
| 2013/0199380 | A1 | * | 8/2013 | Pugh .................... A47J 36/022 99/426 |

\* cited by examiner

METHODS FOR MANUFACTURING SERVING TRAY WITH INNER RAISED SURFACE INCORPORATING THERMOPLASTIC POLYURETHANE

RELATED APPLICATIONS

This application is a Continuation-in-Part application of non-provisional patent application entitled, "Serving Tray Incorporating Thermoplastic Polyurethane and Methods for Manufacturing the Same," Ser. No. 15/153,274, filed on May 12, 2016, under 35 USC 120, which is incorporated herein by reference.

BACKGROUND

Field of the Technology

The invention relates to the field of plastic trays and methods for manufacturing the same.

Description of the Prior Art

Serving trays have long been used in a variety of settings including cafeterias, hospitals, hotels, bars, and restaurants. Many of these serving trays are comprised of plastic or plastic composites including polyester resin and other variations of polyethylene. Other trays may comprise one or more layers of fiberglass strand mats blended into their structure for increased structural strength and durability.

Many trays currently in use comprise a textured, upward facing surface which aides in the prevention of items which are placed on the tray from sliding or moving about when the tray is moved or carried. Typically, a textured surface is formed or defined in the top surface of the tray itself and is usually in the form of a series of ridges or protrusions which interact with a bottom surface of an item which is placed on the tray. Other trays do not comprise any textured surface at all but instead comprise a mat made of rubber, cork, or other suitable material which is then laid directly and/or adhered onto the tray. The textured surface or mat then serves to help maintain any item placed on the tray in a fixed position.

While serving trays with raised or textured surfaces have helped reduce instances of items placed on trays such as plates, glasses, and other dishware from slipping and/or breaking, they are not completely fool proof and can still lead to unnecessary accidents and increased costs. Condensation which has formed on the outside surfaces of glasses can run down into the raised textured surface of the tray and make them slick thus increasing the chances that a glass may slide or tip over when the tray is being moved. Rubber and cork insert layers can break down over time after repeated exposure to moisture which reduces the overall durability and effective lifetime of the tray, forcing the user to discard or refurbish the tray at greater expense.

What is needed is a serving tray comprising a textured surface that is not subject to the limitations of the previous art and which is capable of sustaining a glass or other object at an upright orientation regardless of condensation or other environmental factors. Additionally, a plurality of methods of manufacturing are needed in order to produce such a tray.

BRIEF SUMMARY

The current invention is a serving tray which includes a top surface, a bottom surface disposed on an opposing side of the top surface, and a raised edge disposed about the top surface. The tray also includes an inner support structure disposed circumferentially around the top surface. Disposed within the raised edge are at least two elongated lips, while the top surface has a textured relief defined into it. Both the top surface and the bottom surface are made of at least one synthetic material, while the textured relief is made from an insert that is integrally bonded with the at least one synthetic material.

In one embodiment, the insert of the tray which is integrally bonded with the at least one synthetic material is specifically made of a sheet of thermoplastic polyurethane (TPU).

In another embodiment, the inner support structure of the tray includes a protrusion in its surface which provides an upward facing edge around the circumference of the top surface of the tray.

In yet another embodiment, the inner support structure of the tray is disposed on the raised edge and above the top surface.

In still a further embodiment, the tray is made from a number of synthetic layers including at least two layers of randomly distributed and continuous glass fiber filament sheets, at least two layers of crisscrossed interlocking glass fiber sheets with a chemical binder, and an interstitial layer of polycarbonate resin.

In one embodiment, the tray further includes a shaped smooth boundary portion that is located between the textured surface and the inner support structure on the raised edge on the top surface.

In yet another embodiment, the textured relief includes a number of raised protrusions and a number of recessed indentations that are asymmetrically disposed over the top surface.

The invention also includes an improvement in a method of making a friction enhanced tray in a compression molding apparatus. The method includes placing an insert on top of a lower tool portion of the compression molding apparatus, layering at least two layers of randomly distributed and continuous glass fiber filament sheets on top of the insert, and then layering at least two layers of crisscrossed interlocking glass fiber sheets with a chemical binder on top of the insert. Next, an interstitial layer of polycarbonate resin is disposed between the at least two layers of crisscrossed interlocking glass fiber sheets with a chemical binder. The insert, the least two layers of randomly distributed and continuous glass fiber filament sheets, the at least two layers of crisscrossed interlocking glass fiber sheets with a chemical binder, and the interstitial layer of polycarbonate resin are then compressed against the lower tool portion of the compression molding apparatus and which also defines an inner support structure in the friction enhanced tray. Finally, a textured relief is defined within the insert.

In one embodiment, the method step of defining the textured relief within the insert includes impressing a chemically etched mold surface disposed on the lower tool portion into a surface of the insert.

In another embodiment, the method step of compressing the insert and defining an inner support structure in the friction enhanced tray specifically includes defining the inner support structure above the insert on a raised edge that is disposed around the circumference of the insert. Defining the inner support structure above the insert on a raised edge that is disposed around the circumference of the insert further includes defining a protrusion along the length of the inner support structure.

In yet another embodiment, the method also includes defining a shaped smooth boundary portion that is disposed around the textured relief defined in the insert and beneath the inner support structure.

In a further embodiment, the method step of placing the insert on top of a lower tool portion of the compression molding apparatus specifically includes placing a sheet of thermoplastic polyurethane (TPU) on top of the lower tool portion of the compression molding apparatus.

Finally, in a further embodiment the method step of defining a textured relief within the insert includes asymmetrically defining a plurality of raised protrusions and a plurality of recessed indentations into a surface of the insert.

The invention also includes an improvement in a method of making a friction enhanced tray in an injection molding apparatus. The method includes placing an insert on a first half of a mold of the injection molding apparatus, enclosing the insert by bringing a second half of the mold against the first half of the mold, the first and second halves of the mold forming a completed mold tool, and then injecting a liquid interstitial resin into the completed mold tool. Next, a tray is formed around the insert within the completed mold tool. At the same time, an inner support structure is formed in the tray while a textured relief is defined within a surface of the insert.

In one embodiment, the method step of defining the textured relief within a surface of the insert specifically includes impressing a mold surface disposed on the first half of the mold into the surface of the insert.

In another embodiment, the method step of forming an inner support structure in the tray includes forming the inner support structure above the insert on a raised edge that is disposed around the circumference of the insert. This embodiment further includes where forming the inner support structure above the insert on a raised edge that is disposed around the circumference of the insert includes forming a protrusion along the length of the inner support structure.

In another embodiment, the method further includes defining a shaped smooth boundary portion disposed around the textured relief defined in the surface of the insert and beneath the inner support structure.

In yet another embodiment, the method step of placing an insert on a first half of a mold of the injection molding apparatus specifically includes placing a sheet of thermoplastic polyurethane (TPU) on the first half of the mold of the injection molding apparatus.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
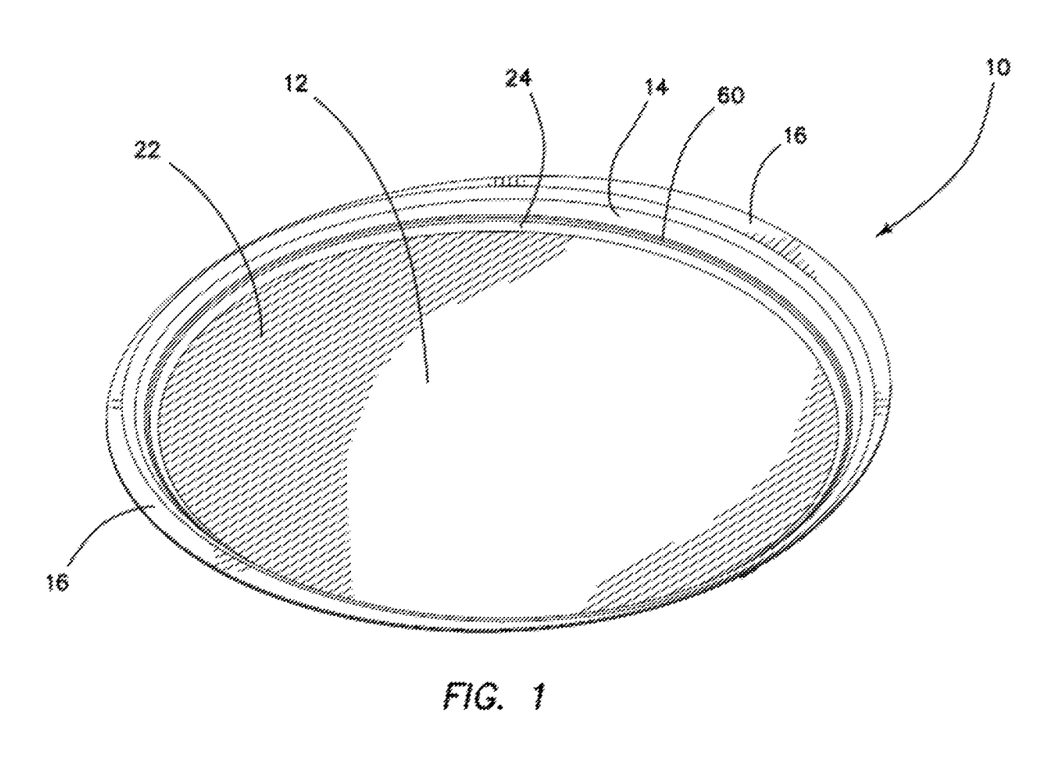
FIG. 1 is a perspective view of a serving tray of the current invention.
Figure 2:
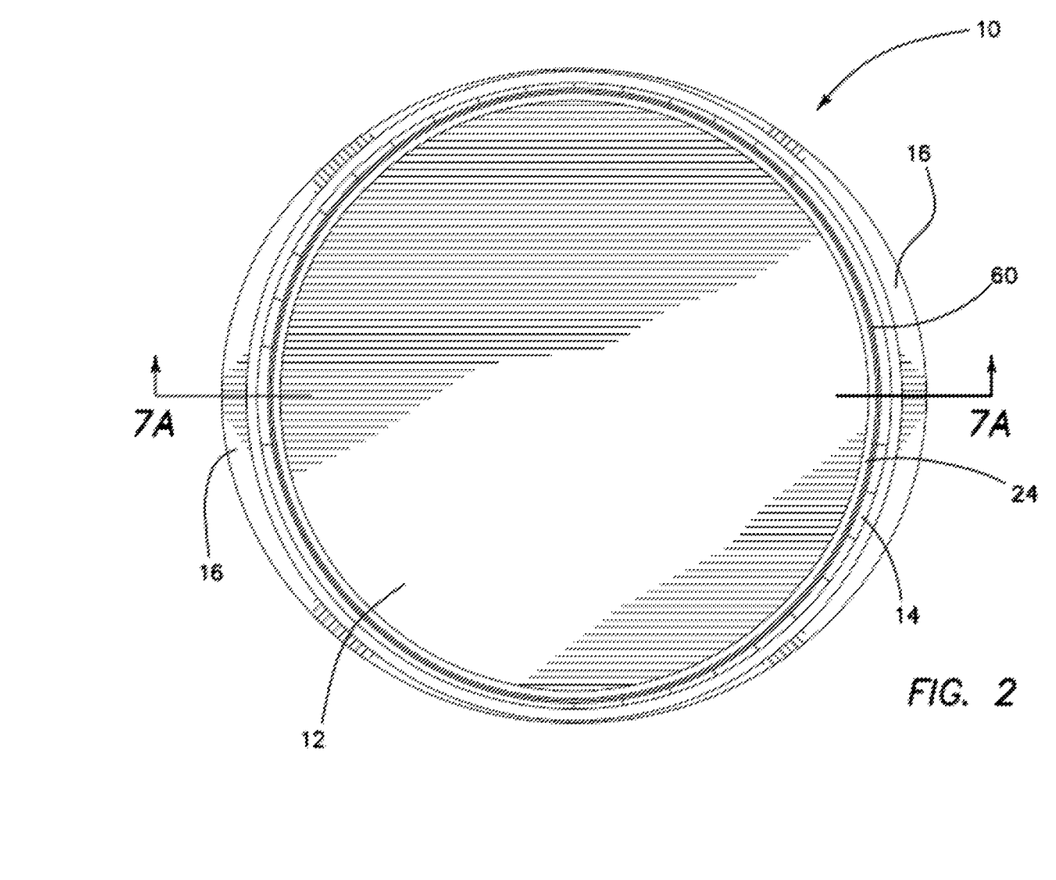
FIG. 2 is a top view of the serving tray seen in FIG. 1.
Figure 3:
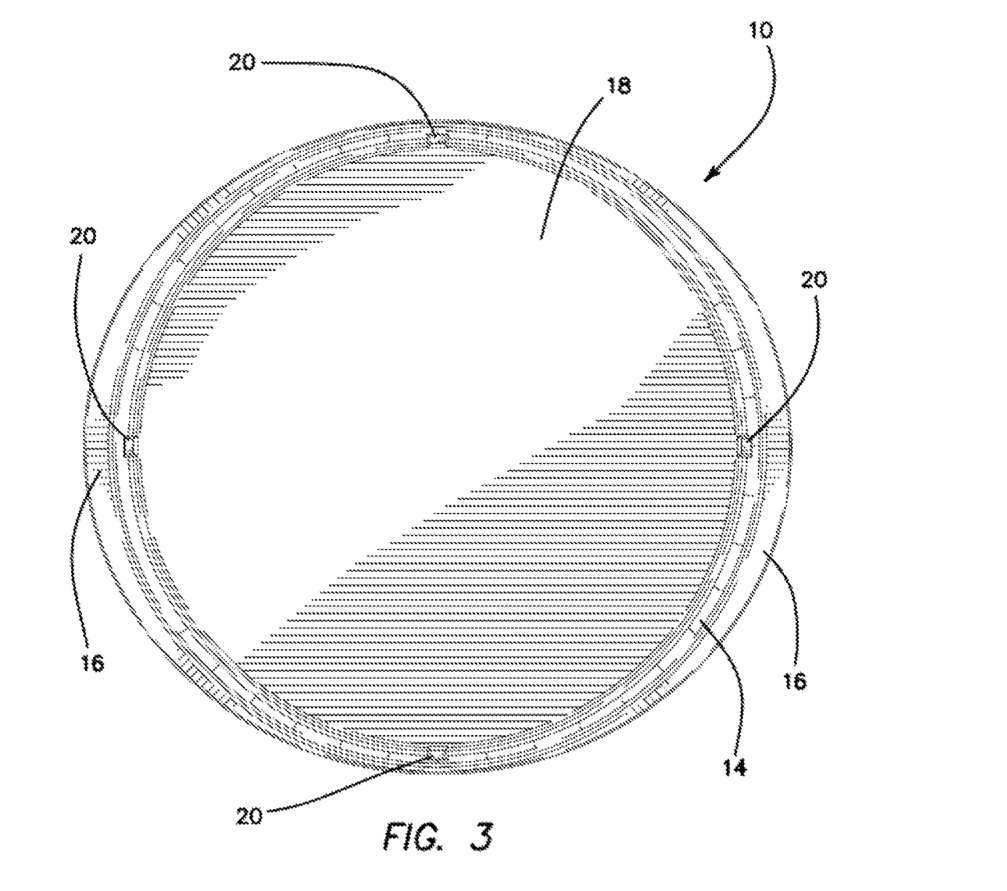
FIG. 3 is a bottom view of the serving tray seen in FIG. 1.

The current invention comprises a manufactured serving tray which may be seen in FIGS. 1-3 and which is denoted generally under reference numeral 10. As seen in FIGS. 1-3, the tray 10 is substantially circular shaped, however other shapes known in the art such as rectangles, squares, and the like may be used without departing from the original spirit and scope of the invention. The tray 10 comprises a top surface 12 which is surrounded circumferentially by a raised edge 14. The raised edge 14 begins at the outer edge of the top surface 12 and is disposed at an angle relative to the top surface 12 which is substantially horizontal or flat. The raised edge 14 further comprises at least two elongated lips 16 which are diametrically disposed across the tray 10. Each lip 16 represents a bulge or increased surface area portion compared to the rest of the raised edge 14 as best seen in the top down view of FIG. 2 that is orientated substantially perpendicular to the inclined orientation of the raised edge 14. The tray 10 also comprises a bottom surface 18 as seen in FIG. 3. The bottom surface 18 further comprises a plurality of feet 20 disposed in a symmetrical pattern around the circumference of the bottom surface 18. The plurality of feet 20 help keep the tray 10 in a fixed position when placed on a table or other horizontal surface as is known in the art.

As best seen in FIG. 2, the top surface 12 is substantially round or circular shaped, while the lips 16 help form or stretch the overall shape of the raised edge 14 a substantially oval or oblong shape, thus creating an oval or oblong shaped upper profile of the tray and a circular shaped lower profile of the tray. The oblong shaped upper profile of the tray 10 comprising the lips 16 allows a user to easily grip and carry the tray 10 when glassware and other items on placed on its top surface 12 while the circular lower profile of the tray 10 allows multiple trays to be stacked or nested within one another without regard to each successive tray's 10 orientation with regard to each other. In other words, when a second tray is placed on top of the first tray 10, the circular lower profile of the second tray fits easily and snuggly on top of the top surface 12 and within the confines of the raised edge 14 of the first tray 10 regardless of which direction the lips 16 are currently orientated in. This therefore allows a plurality of trays 10 to be quickly and efficiently stacked upon each other when the trays 10 are not in use or when held in storage.

The tray 10 further comprises a textured relief 22 defined into the top surface 12. The textured relief 22 preferably comprises a plurality or sequence of raised ridges or protrusions and a corresponding plurality of recessed indentations or depressions distributed about the top surface 12 in an asymmetrical pattern, however other similar or equivalent relief patterns now known or later devised may be used without significantly departing from the original spirit and scope of the invention. The textured relief 22 is configured to dramatically increase the coefficient of friction of the top surface 12 so that when glassware or other items are placed upon it, the item will remain frictionally engaged and motionless on the top surface even when the tray 10 is titled at an angle of up to and including 45 degrees relative to the horizontal. The textured relief 22 is defined across the substantial majority of the top surface 12, however as best seen in FIG. 2, the textured relief 22 ends at a specified distance away from the beginning of the raised edge 14, thus leaving a shaped smooth boundary portion 24 disposed about a circumference of the tray 10 between the relief portion 22 and the raised edge 14.

As also seen in FIGS. 1 and 2, the tray 10 further comprises an inner support structure 60. The inner support structure 60 is a substantially ring or annular shaped protrusion that is elevated or raised with respect to the surface of the raised edge 14. The inner support structure 60 is disposed along the surface of the raised edge 14 and above the top surface 12 and smooth boundary portion 24. As best seen in FIG. 2, the inner support structure 60 is disposed about the entire inner circumference of the tray 10.

The majority of the tray 10 is preferably comprised of successive layers of plastic or plastic composites as will be detailed further below, however disposed at or on the top surface 12 is preferably an insert 26 comprising at least one layer of thermoplastic polyurethane (TPU). As is known in the art, TPU is part of a class of polyurethane plastics which has a high shear strength and a high elasticity, making it ideal for being used in a molding process. TPU is also highly resistant to liquids, oil, and grease, thus further making it suitable for use in the food and beverage industry where contact with various liquids or oils is commonplace. When an item such as a glass, cup, or other dishware is placed on the tray 10 that comprises an insert 26 comprised of TPU that is integrally bonded with the top surface 12, the item will remain upright on the tray 10 even when the tray 10 is tilted at an angle of up to 45 degrees from the horizontal. Because of the ability of TPU to resist liquid, the tray 10 comprising a TPU top surface 12 will also maintain the item in an upright position even if that item is wet, condensation has formed on the item, or if liquid has been spilled on the top surface 12 of the tray 10.

Figure 7A:
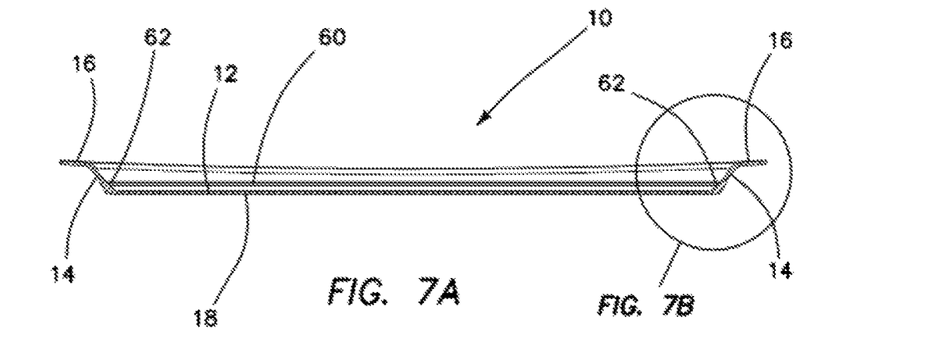
FIG. 7A is a cross sectional view of the serving tray seen in FIG. 6.
Figure 7B:
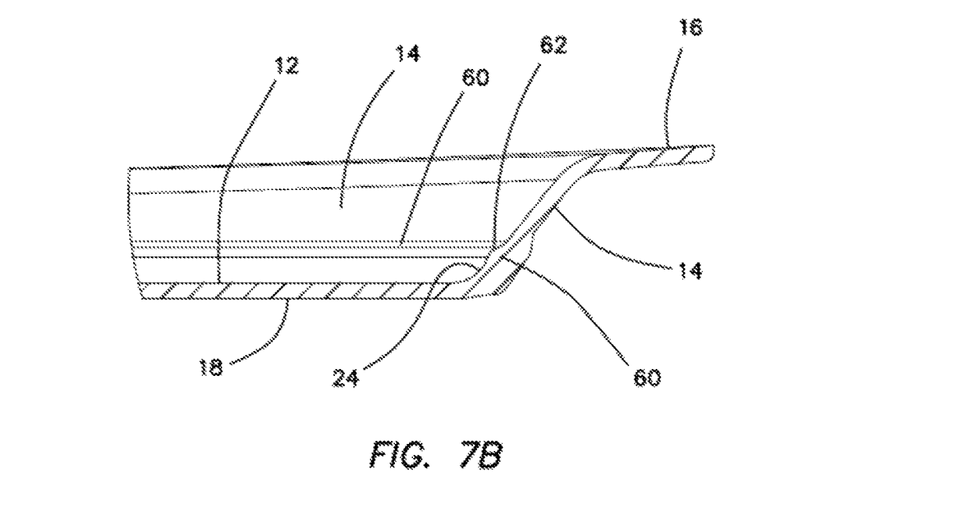
FIG. 7B is a magnified cross sectional view of surface of the serving tray seen in FIG. 7A.

Greater detail of the inner support structure 60 may be seen in FIGS. 7A and 7B. The inner support structure 60 is disposed about the circumference of the tray 10 at a constant elevation above the top surface 12 and along the inner surface of the raised edge 14. As best seen in the magnified view of FIG. 7B, the inner support structure 60 specifically comprises a protrusion or bump 62 which provides a localized increased thickness to the raised edge 14, thus creating an upward facing edge or surface around the inner circumference of the serving area of the tray 10.

Figure 8:
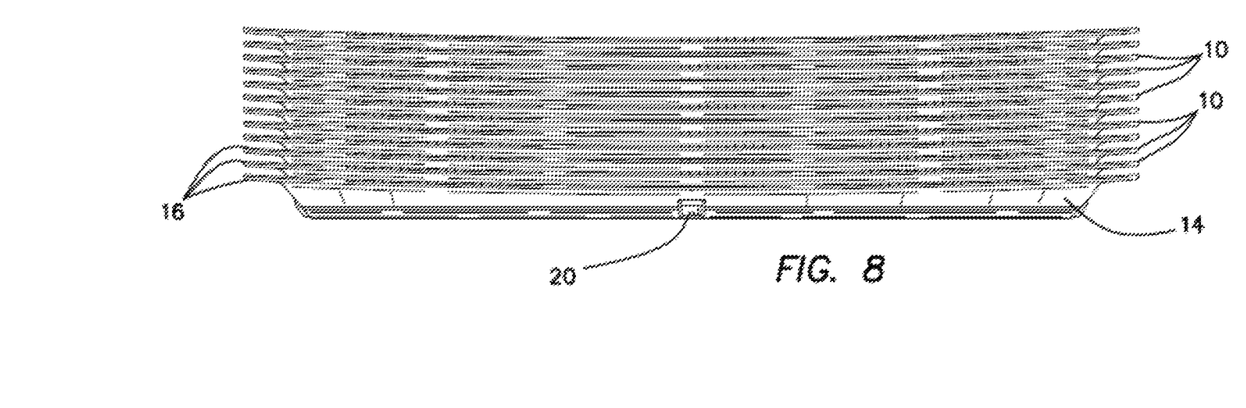
FIG. 8 is a side elevational view of a plurality of serving trays seen in FIGS. 1 and 6 when stacked or nested within one another.
Figure 9A:
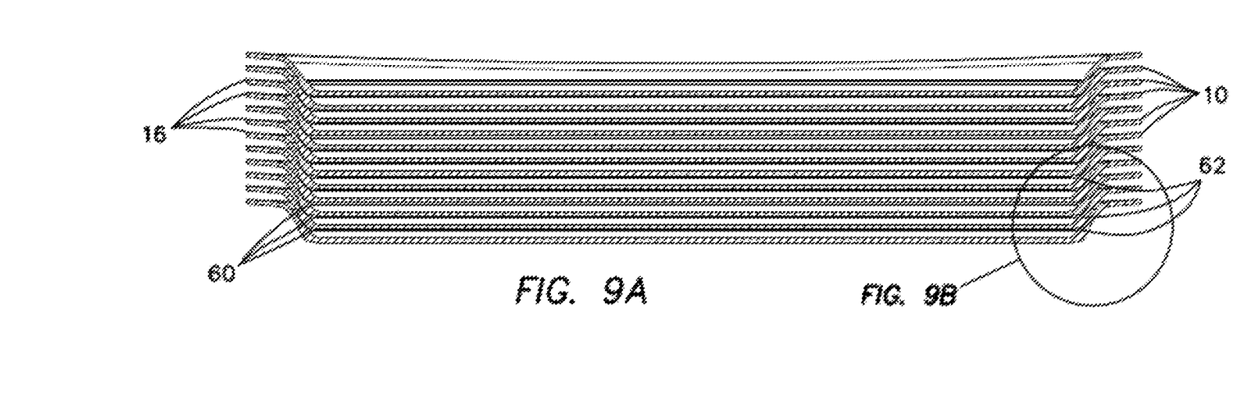
FIG. 9A is a cross sectional view of the plurality of stacked or nested serving trays seen in FIG. 8.
Figure 9B:
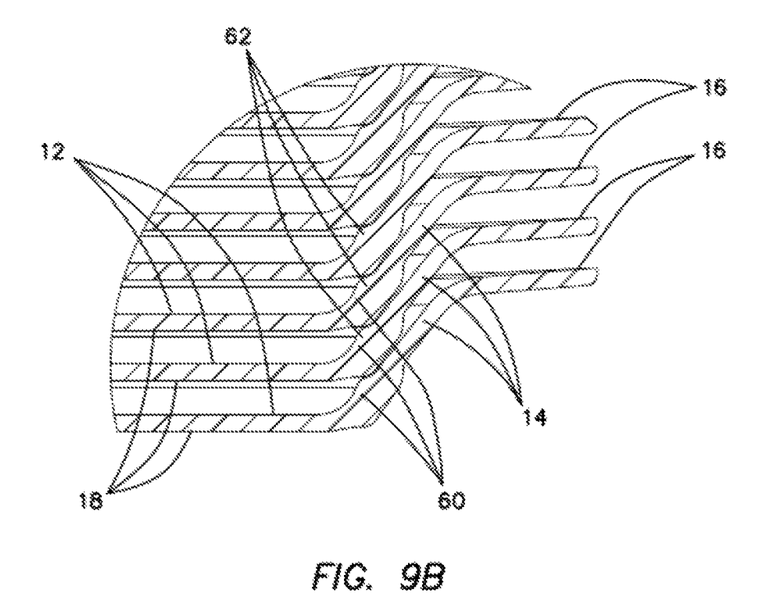
FIG. 9B is a magnified cross sectional view of the stacked or nested surfaces of the plurality of serving trays seen in FIG. 9A.

Having an inner support structure 60 aides in the ability of a plurality of trays 10 to be nested or stacked as seen in FIGS. 8, 9A, and 9B. FIGS. 8 and 9A show that when a plurality of trays 10 are stacked vertically on one another, each subsequent tray 10 is placed within the tray 10 disposed directly beneath it, specifically with the bottom surface 18 of the nested tray 10 being disposed within the enclosed circumference formed by the raised edge 14 of the tray 10 beneath it. The magnified cross section of FIG. 9B shows that when the bottom surface 18 of a tray 10 to be stacked is placed into a tray 10 disposed beneath it, it comes to rest on top of the inner support structure 60. More specifically, the bottom surface 18 rests upon the upward facing surface of the protrusion 62. Because the inner support structure 60 is disposed around the circumference of the tray 10, any subsequent tray 10 which is nested within it will be maintained at a constant elevation that is above that of the top surface 12 of the bottom tray 10. The process may be repeated for each subsequently nested tray 10 with the bottom surface 18 of each tray 10 resting on the inner support structure 60 of the tray 10 disposed directly beneath it so that a stack is formed as seen in FIGS. 8 and 9A. Having each tray 10 maintained at a raised elevation with respect to the tray 10 beneath it when in a stacked configuration allows the plurality of trays 10 to be easily stacked in a stable position. Additionally, because each tray 10 is maintained at a fixed elevated position, the lips 16 of each tray 10 are also maintained at a fixed elevated position with respect to one another as seen in FIG. 9B, thus allowing a user to easily and quickly grab a single tray 10 by grabbing the corresponding lip 16 and lifting upwards. The inner support structure 60 of the current tray 10 thus prevents the plurality of trays 10 from becoming wedged or stuck together when placed in a stacked configuration.

Figure 4:
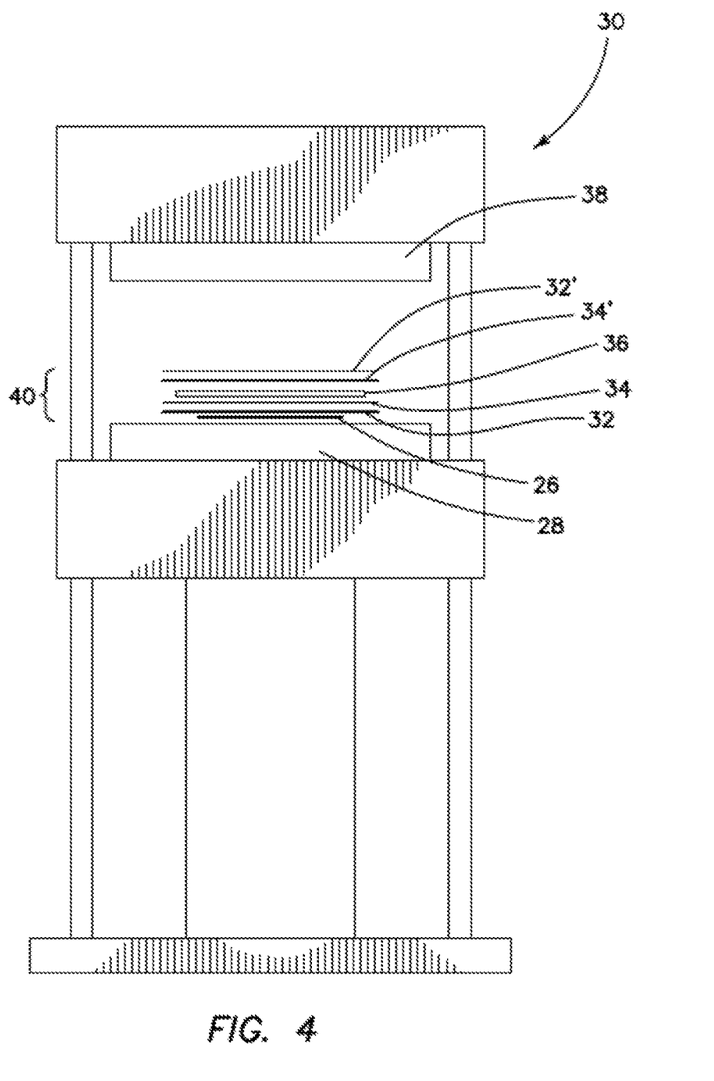
FIG. 4 is a block diagram showing of a compression molding device used to fabricate the serving tray seen in FIG. 1.

In one embodiment, the tray 10 may be manufactured according to a compression wet molding process. In this embodiment as seen in FIG. 4, an insert 26 comprising a sheet of TPU is placed on a lower tool 28 of a compression manufacturing device shown generally as reference numeral 30. The TPU sheet 26 preferably comprises a durometer value of 65A to 85D and an overall thickness of 0.005 in. to 0.060 in., however other durometer or thickness values may be used without significantly departing from the overall scope and spirit of the claim. A first surmat or fiberglass veil 32 is placed over the TPU sheet 26, followed by a first chopped strand mat 34. A portion of liquid state polyester resin 36 is then evenly or symmetrically distributed over the first chopped strand mat 34. Next, a second chopped strand mat 34' is placed over the now resin covered first chopped strand mat 34. Finally, a second surmat or fiberglass veil 32' is layered on the second chopped strand mat 34', thus completing a fully formed stack or sandwich 40 which is used to form the tray 10. Alternatively, the TPU sheet 26 may be placed directly on the lower tool 28 while the sandwich 40 comprising the first and second surmat 32, 32', the first and second chopped strand mat 34, 34' and the resin 36 is formed at a separate location. The resin 36 is preferably an interstitial resin, meaning the resin 36 is allowed to flow and completely fill in the volume defined between the first and second chopped strand mats 34, 34'. The formed sandwich 40 as a single unit may then be moved to the compression manufacturing device 30 and placed on the TPU sheet 26. After all the layers of the tray 10 are in place, the compression manufacturing device 30 is activated and an upper tool 38 moves downward and presses the sandwich 40 and TPU sheet 26 against the lower tool 38, compressing the layers into a shape as dictated by the shape of the lower and upper tools 28, 38. As the layers of the tray 10 are being compressed, each layer of the tray are pressed together and a mechanical bond is formed between each subsequent layer, including the TPU sheet 26 which becomes an integral part of the structure of the tray 10. At the same time, the lower tool 28 which comprises a chemically etched mold for the top surface 12 of the tray 12, presses into the TPU sheet 26 deep enough to sufficiently form the textured relief 22, preferably to a depth range from 0.002 in. to 0.025 in. The mold etched into the surface of the lower tool 28 is configured so as to form the smooth portion 24 and the support structure 60. Having a smooth portion 24 located on the top surface 12 of the tray 10 is critical since it creates a buffer zone disposed between the support structure 60 and the textured relief 22. Resin 36 which leaks or is pushed out by the compression process is stopped by the mold of the lower tool 28 which prevents the resin 36 from interfering with the fabrication of the textured relief 22. If resin 36 is allowed to seep onto the top surface 12 as the textured relief 22 is being formed, the resin 36 will be compressed into the TPU sheet 26 and the various ridges, protrusions, indentations, and depressions which comprise the textured relief 22 will be filled in or covered by the resin 36, thus effectively spoiling the desired friction profile of the textured relief 22. Once compression is complete, the upper tool 38 is drawn away from the lower tool 28 and the now fully formed tray 10 may be lifted up off the lower tool 28 and removed from the compression manufacturing device 30. A user may then repeat the process and create additional trays 10 as needed.

The first and second chopped strand mat 34, 34' are preferably comprised of crisscrossed, interlocking glass fibers with a chemical binder which holds the glass fibers together in sheet form. Depending the density of the glass fibers, each chopped strand mat 34, 34' may have a weight of 1.25, 1.5, 1.75, or 2 ounces per square foot. In contrast, the first and second surmat 32, 32' are comprised of continuous glass fiber filaments that are randomly distributed and bonded together with a specially formulated resin or binder. The first and second surmats 32, 32' bring the resin 36 to the surface of the tray 10 and improves the overall surface appearance of the tray 10. Each surmat 32, 32 preferably has a thickness that is between 7 mm/2.6 grams per square foot to 30 mm/9.7 grams per square foot. Both the chopped strand mats 34, 34' and the surmats 32, 32' each comprise sizing which is a silane coupling agent. The sizing helps form the necessary bond between the fiber glass filaments of the surmats 32, 32' and chopped strand mats 34, 34' with the resin 36 in order to produce the tray 10.

While the insert 26 has been described above as comprising a sheet of TPU which is used as the top most additive added to the composition of the tray 10, similar or additional materials may also be used without departing from the original spirit and scope of the invention. For example, the insert may comprise other materials such as rubber, silicone, paper coated with polyurethane, a styrene acrylonitrile (SAN) sheet coated with polyurethane, or a combination thereof.

Similarly, while epoxy resins has been described above as being used as forming the main composition of the tray 10, this is meant to be for illustrative purposes only. Similar or additional substances other than what is disclosed above may also be used without departing from the original spirit and scope of the invention, for example thermoset matrix resins, vinyl ester, or unsaturated polyester. More specifically, the type of unsaturated polyester used may include but is not limited to bispheon A fumerate, DCPD-modified, fire-retardant, isophthalic, low-VOC or no VOC, orthophthalic, or terephthalic unsaturated polyesters, or a combination thereof.

Figure 5:
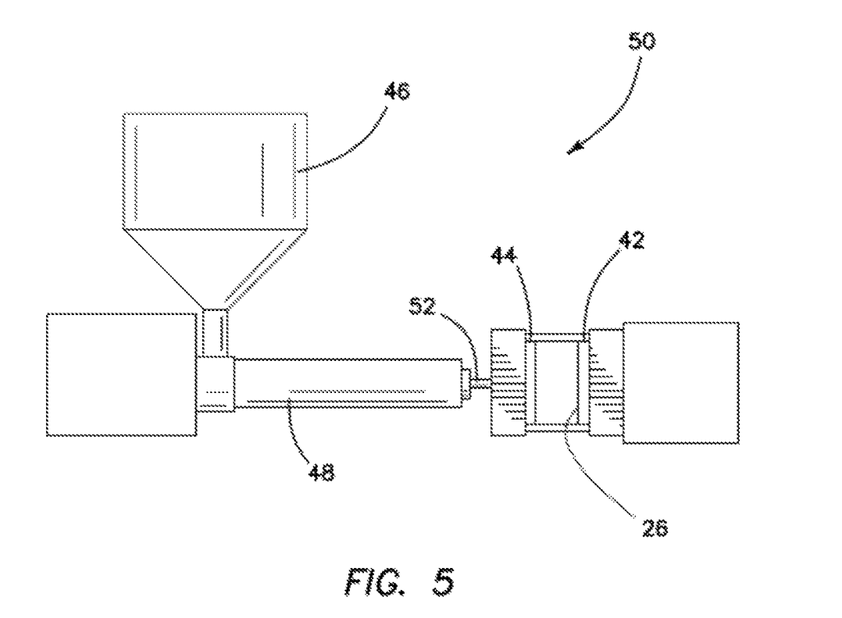
FIG. 5 is a block diagram showing the configuration of an injection molding device used to fabricate the serving tray seen in FIG. 1.
Figure 6:
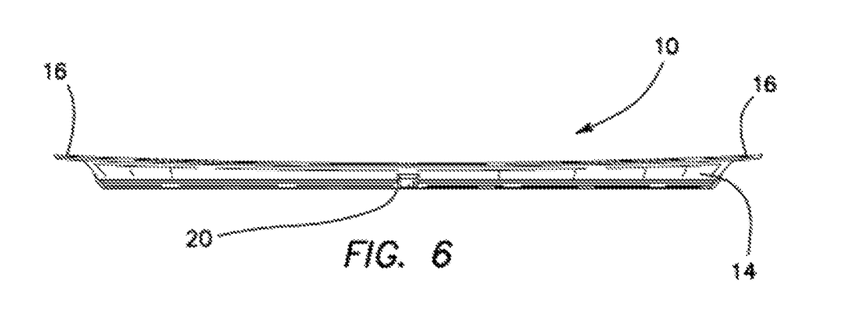
FIG. 6 is a side elevational view of the serving tray seen in FIG. 1.

In another embodiment, the tray 10 may be fabricated according to an injection molding technique. In this embodiment as seen in FIG. 5, a sheet of TPU 26 is placed on a first half 42 of a mold of an injection molding device shown generally as reference numeral 50. The mold then closes by bringing the second half 44 of the mold against the first half 42. At the same time, plastic or plastic composite pellets are delivered from a hopper 46 into a heated barrel 48. The barrel 48 heats the pellets to create a liquid or interstitial polymer resin from the material which comprised the pellets and delivers the resin to the mold via an injection nozzle. The resin then flows into the mold and forms a tray 10 around the TPU sheet 26 as determined by the specific contours and shape of the mold itself. The first half 42 of the mold, like the lower tool 28 as disclosed above, is chemically etched to form the textured relief 22 on the top surface 12 of the tray 12. The combined pressure of the first and second halves 42, 44 presses into the TPU sheet 26 deep enough to sufficiently form the textured relief 22 and incorporate the TPU sheet 26 into the integral structure of the tray 10. The etched surface of the first half 42 of the tool is configured so as to form the smooth portion 24 and support structure 60 seen in FIG. 2. Once the mold has been sufficiently filled with resin, the mold is allowed to cool. The mold is then opened by pulling the second half 44 away from the first half 42. The now fully formed tray 10 is then ejected or otherwise removed from the mold and the entire process is allowed to repeat itself as needed.

While the insert 26 has been described above as comprising a TPU sheet which is used as the additive added to the mold before the resin is injected into the mold, similar or additional materials may also be used without departing from the original spirit and scope of the invention. For example, the insert 26 may comprise other materials such as rubber, silicone, paper coated with polyurethane, a styrene acrylonitrile (SAN) sheet coated with polyurethane, or combinations thereof.

Similarly, while plastic pellets have been described above as being heated to create a polymer resin which is injected into the mold to form the tray 10, this is meant to be for illustrative purposes only. Similar or additional substances other than what is disclosed above may also be used without departing from the original spirit and scope of the invention. For example, polycarbonate, copolymer, polypropylene, or polyethylene resins may also be used. Additionally, other substances such as nylon, acrylic back up (ABU), TPU, or a combination thereof can also be used to form the tray 10 and achieve a substantially similar result.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. An improvement in a method of making a friction enhanced tray in a compression molding apparatus comprising:
   placing an insert on top of a lower tool portion of the compression molding apparatus;
   layering at least two layers of randomly distributed and continuous glass fiber filament sheets on top of the insert;
   layering at least two layers of chopped strand glass fiber sheets with a chemical binder on top of the insert;
   disposing an interstitial layer of polycarbonate resin between the at least two layers of chopped strand glass fiber sheets with a chemical binder; and
   compressing the insert, the least two layers of randomly distributed and continuous glass fiber filament sheets, the at least two layers of chopped strand glass fiber sheets with a chemical binder, and the interstitial layer of polycarbonate resin against the lower tool portion of the compression molding apparatus and defining an inner support structure in the friction enhanced tray,
   wherein compressing the insert comprises defining a textured relief within the insert.

2. The method of claim 1 wherein defining the textured relief within the insert comprises impressing a chemically etched mold surface disposed on the lower tool portion into a surface of the insert.

3. The method of claim 1 where compressing the insert and defining an inner support structure in the friction enhanced tray comprises defining the inner support structure above the insert on a raised edge disposed around the circumference of the insert.

4. The method of claim 3 where defining the inner support structure above the insert on a raised edge disposed around the circumference of the insert comprises defining a protrusion around the circumference of the insert.

5. The method of claim 1 further comprising defining a shaped smooth boundary portion disposed around the textured relief defined in the insert and beneath the inner support structure.

6. The method of claim 1 wherein placing the insert on top of a lower tool portion of the compression molding apparatus comprises placing a sheet of thermoplastic polyurethane (TPU) on top of the lower tool portion of the compression molding apparatus.

7. The method of claim 1 wherein defining a textured relief within the insert comprises asymmetrically defining a plurality of raised protrusions and a plurality of recessed indentations into a surface of the insert.

8. An improvement in a method of making a friction enhanced tray comprising:
   placing a sheet of thermoplastic polyurethane (TPU) on top of a first half of a tool;
   forming a stack of material on top of the sheet of TPU;
   enclosing the sheet of TPU and the stack within the tool by bringing a second half of the tool against the first half of the tool; and
   integrally molding the sheet of TPU to the stack of material,
   wherein integrally molding the sheet of TPU to the stack of material comprises:
      defining a textured relief comprising a plurality of protrusions and a plurality of indentations asymmetrically across the sheet of TPU, wherein the plurality of protrusions are raised relative to the sheet of TPU and wherein the plurality of indentations are recessed relative to the sheet of TPU;
      defining an inner support structure circumferentially around the sheet of TPU; and
      defining a shaped smooth boundary portion between the textured relief and the inner support structure, and
   wherein forming the stack of material on top of the sheet of TPU comprises:
      providing a first layer of fiberglass veil;
      layering a first chopped strand mat on top of the first layer of fiberglass veil;
      distributing a liquid state polyester resin symmetrically over the first chopped strand mat;
      layering a second chopped strand mat on top of the liquid state polyester resin; and
      layering a second layer of fiberglass veil on top of the second chopped strand mat.

9. The method of claim 8 wherein integrally bonding the sheet of TPU into a material used to form the tray comprises compressing the sheet of TPU into the first layer of fiberglass veil of the stack.

10. The method of claim 8 wherein defining the textured relief across the TPU, defining the inner support structure circumferentially around the sheet of TPU, and defining the shaped smooth boundary portion each comprises impressing a chemically etched mold surface disposed on the first half of the tool into the sheet of TPU.

11. The method of claim 8 wherein defining the textured relief comprising a plurality of indentations across the sheet of TPU comprises defining the plurality of indentations to a depth of 0.002-0.025 inches relative to the sheet of TPU.

\* \* \* \* \*